Figure 1:
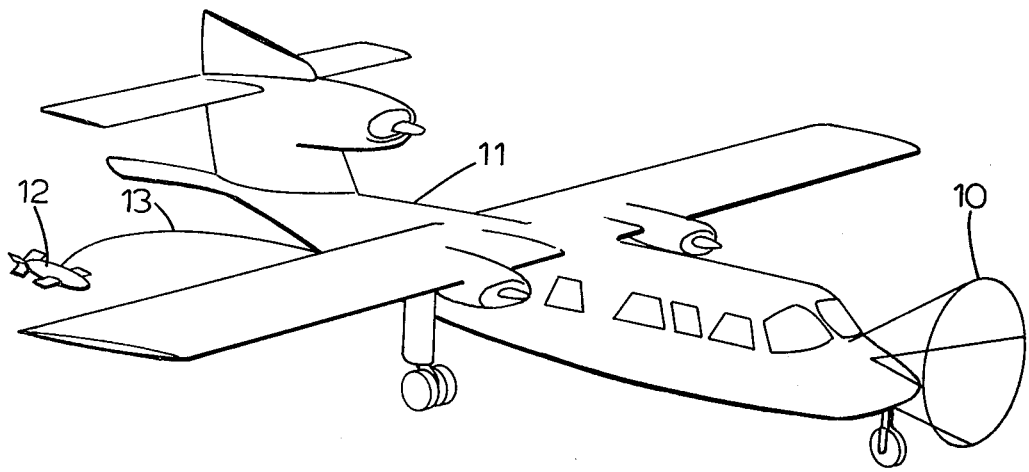

United States Patent [19]

Barringer

[11] 3,950,695

[45] Apr. 13, 1976

[54] GEOPHYSICAL PROSPECTING METHOD UTILIZING CORRELATION OF RECEIVED WAVEFORMS WITH STORED REFERENCE WAVEFORMS

[75] Inventor: Anthony Rene Barringer, Willowdale, Canada

[73] Assignee: Barringer Research Limited, Rexdale, Canada

[22] Filed: Oct. 15, 1974

[21] Appl. No.: 514,879

Related U.S. Application Data

[63] Continuation-in-part of Ser. No. 349,629, April 9, 1973, Pat. No. 3,852,659.

[52] U.S. Cl. .............................. 324/3; 324/4; 324/6
[51] Int. Cl.² ...................... G01V 3/10; G01V 3/16
[58] Field of Search ......... 324/3, 4, 6, 8, 77 J, 77 G

[56] References Cited
UNITED STATES PATENTS

| | | | |
|---|---|---|---|
| 2,165,214 | 7/1939 | Blau et al. | 324/6 X |
| 2,929,984 | 3/1960 | Puranen et al. | 324/4 X |
| 3,014,176 | 12/1961 | McLaughlin et al. | 324/4 |
| 3,020,471 | 2/1962 | Barringer | 324/4 X |
| 3,105,934 | 10/1963 | Barringer | 324/4 |
| 3,271,732 | 9/1966 | Anstey et al. | 324/77 J X |
| 3,321,700 | 5/1967 | Zimmerman | 324/8 |
| 3,490,032 | 1/1970 | Zurflueh | 324/3 X |
| 3,690,164 | 9/1972 | Gabillard et al. | 324/6 X |

Primary Examiner—Gerard R. Strecker
Attorney, Agent, or Firm—Rogers, Bereskin & Parr

[57] ABSTRACT

A method of detecting conductive bodies in an area wherein a primary field having a complex waveform, such as a frequency modulated, rapidly swept signal is generated and is radiated toward the area. A receiving system is provided for sensing the primary and secondary fields. Computerized signal processing techniques are used to obtain the best match between the waveforms of the received signals and those of stored reference waveforms which correspond to responses of known conductive bodies.

6 Claims, 15 Drawing Figures

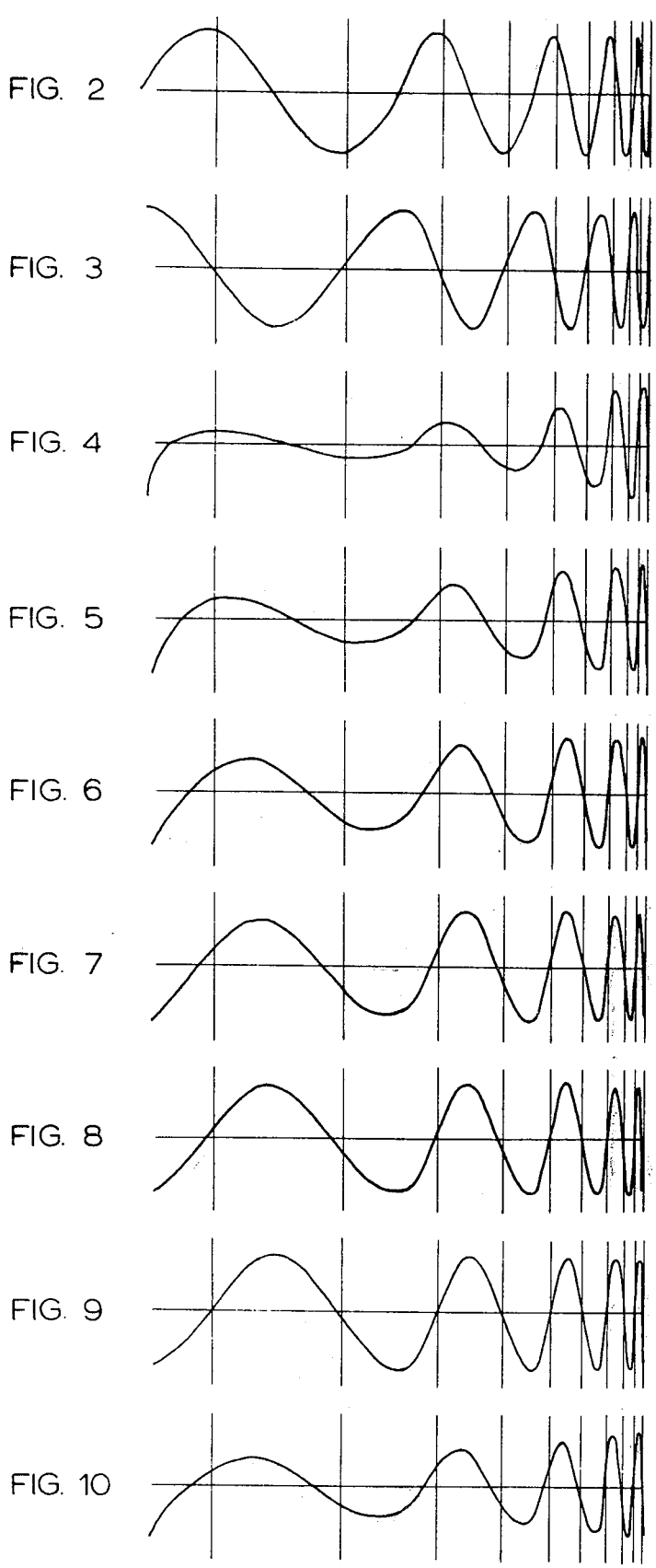

GEOPHYSICAL PROSPECTING METHOD UTILIZING CORRELATION OF RECEIVED WAVEFORMS WITH STORED REFERENCE WAVEFORMS

This application is a continuation-in-part of application Ser. No. 349,629 filed Apr. 9, 1973, now U.S. Pat. No. 3,852,659, Geophysical Prospecting Method and Apparatus Utilizing Correlation of Received Waveforms With Stored Reference Waveforms.

This invention relates to the detection or remote sensing of conductive bodies, and in particular to an airborne and ground mineral exploration method.

Many classes of valuable mineral deposits contain sufficient concentration of sulphide ores to make them strongly conductive in comparison to their enclosing rocks. For many years, geophysical systems for detecting these deposits have employed inductive electromagnetic fields generated by transmitting coils carrying alternating currents which induce eddy currents within sub-surface conductive bodies. These eddy currents generate secondary electromagnetic fields which combine with the primary inducing field to produce resultant electromagnetic fields. These resultant electromagnetic fields may be detected with suitable pick-up coils and their phase and magnitude with reference to the primary field can be monitored during continuous traversing, or at a series of pre-determined stations.

The problem of detecting sub-surface deposits increases substantially when they lie at depths of greater than about 200 feet and when they are covered by conductive overburden. Such overburden may take the form of glacial clay material which is frequently quite conductive due to the ability of clay particles to carry charges. In addition, in semi-arid regions overburden may become strongly conductive due to the presence of salts which are leached out to the surface by the combined effects of erratic rainfall and high rates of evaporation. When electromagnetic prospecting systems are used in the presence of conductive overburden, strong eddy currents are induced in the overburden and secondary fields are thereby produced which tend to mask the presence of secondary fields arising from underlying mineral deposits. Furthermore, conductive overburden tends to attenuate transmission of electromagnetic fields and reduces the effective depth of penetration of electromagnetic geophysical prospecting systems.

There are two principal types of airborne electromagnetic prospecting systems in current use. One type employs rigid mounting of transmitting and receiving coils and the other type employs a non-rigid arrangement. In "rigid" systems the transmitting and receiving coils are mounted on the opposing wingtips of an aircraft, on the nose and tail of the aircraft fuselage, or at the opposing ends of a long rigid boom towed beneath a helicopter. In all such systems the coils are seldom more than 25 meters apart and often much less. In such systems it is necessary for best results, to support the coils with a high degree of rigidity so that coil spacing and angular changes do not exceed more than a few parts per million. This is difficult to achieve in practice. As a result, generally it is desirable to operate rigid systems in smooth air conditions.

Another problem with a number of conventional rigid systems is that when the receiving coil is mounted on the wingtips or in the tail of the aircraft, additional noise is caused by small movements of the metal skin of the aircraft, since such movements tend to change the pattern of eddy currents induced by the transmitter in the aircraft. Furthermore, stray ground currents in the aircraft from generators and other electrical equipment in the aircraft create additional noise which is sometimes difficult to suppress.

In non-rigid airborne electromagnetic systems the receiving coil generally is towed behind the aircraft in a non-metallic streamlined aerodynamic container or "bird" which typically is connected to the aircraft by at least about 50 meters of tow cable. An advantage of this arrangement is that it removes the bird from the close proximity of the aircraft and thereby eliminates some of the sources of noise referred to above. However, as the towed receiving coil or coils continually change their coupling with the primary field it is necessary to eliminate the primary field by, for example, detecting only those secondary fields which are precisely in phase quadrature (i.e. 90° out of phase) with the primary field. One of the disadvantages of such quadrature systems, however, is that much of the secondary field is discarded since it is in-phase with the primary field. Furthermore, the rather limited amount of information available in a quadrature system does not permit a complex conductivity analysis of the underlying terrain.

Another technique for eliminating the effects of changing coupling with the primary field is to employ a series of high powered pulses and to detect the transient secondary field that follows each pulse. Thus a time separation is achieved between the primary and secondary fields. This arrangement is known as the induced pulse transient technique. The main disadvantage of this technique is that a very large part of the secondary field is discarded since it is generated during the period of the primary pulse. As a result it is necessary to use a very much higher power transmitter than typically is employed in other systems in order to compensate for the fact that most of the secondary field is discarded. A system of this type is described in U.S. Pat. No. 3,105,934.

In the present invention advantages of both the rigid and non-rigid airborne electromagnetic systems are combined in order to achieve high signal-to-noise ratios and considerable discrimination against conductive overburden in complex conductivity situations. The invention is applicable to both rigid and non-rigid airborne electromagnetic configurations.

The invention utilizes a primary inductive electromagnetic field having a complex waveform (i.e. a waveform comprising a plurality of frequencies) to induce eddy currents in conductive objects lying in the vicinity of the field, which will in turn re-radiate secondary electromagnetic fields. These secondary electromagnetic fields will have a waveform which is distorted with respect to the primary field waveform to a degree which is dependent upon the size, shape, conductivity, polarizability and permeability of the orebody or conductive object. Such distortion is due to the fact that a complex waveform contains a plurality of frequency components, each one of which is reradiated (as a result of eddy currents) at different relative amplitudes and phase shifts with respect to the primary waveform. The amplitude and phase shift of the secondary field for each frequency component is determined by the characteristics of the conductive body. In addition, overburden and mineral deposits in general have certain separately identifiable families of responses which can be broadly classified and distinguished one from the other.

A method of detecting a conductive body in an area according to the present invention, consists of generating a primary electromagnetic field and directing said primary field towards said area, said primary field being defined by a time varying waveform of known frequency and phase composition, said field containing a plurality of frequency components sufficient to permit the identification of said conductive body in said area, said primary field causing eddy currents to be induced in any conductive body present in said area which is intersected by said primary field, said eddy currents resulting in the formation of secondary electromagnetic fields, receiving electromagnetic signals in the vicinity of said primary electromagnetic field, said received signals including a first portion comprising signals emanating from said area which are responsive in phase and amplitude to said secondary electromagnetic fields, and a second portion that is attributable to direct coupling with said primary electromagnetic field, storing a plurality of reference waveforms which respectively are related in a pre-determined manner to said primary field and to electrical responses characteristic of a plurality of different types of conductive bodies, and comparing said received electromagnetic signals with said stored reference waveforms and indicating the reference waveforms which respectively provide optimum correlation with one or more selected components of said received signals.

Computerized signal processing techniques are used to obtain the best match between the waveforms of the received signals and those of stored reference waveforms which correspond to known geological structures or conditions. An advantage of the present invention over systems such as the induced pulse transient technique described in U.S. Pat. No. 3105934 is that the entire secondary field may be analyzed if desired, i.e. the field received during the time when the primary field is operative. Also, the present invention provides in effect narrow band filtering of the desired waveforms and rejection of noise signals such as thermal noise in the receiving coil, microphonics in the receiver, sferic interference from nearby and distant thunderstorms, etc.

Figure 11:
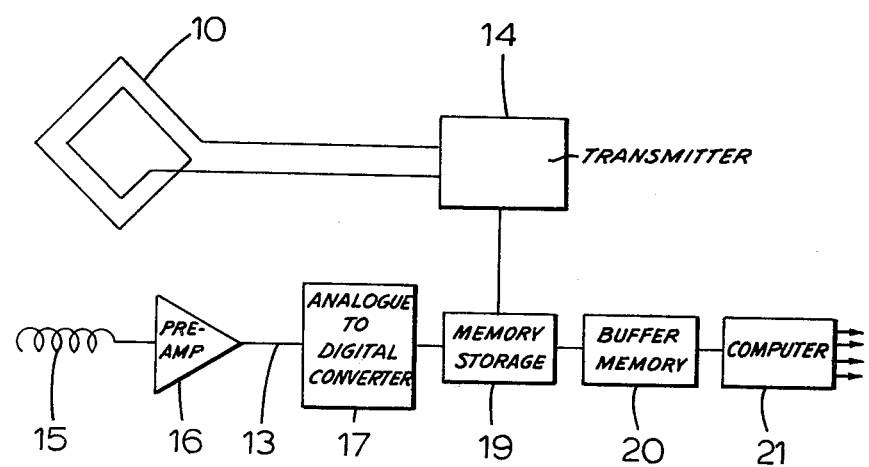

In the drawings,

FIG. 1 is a diagrammatic view of a survey aircraft carrying transmitting and receiving apparatus, FIGS. 2 – 10 and 12 – 15 are graphical views illustrating waveforms referred to below, and FIG. 11 is a block diagram of the principal components of a preferred embodiment of the invention.

The invention will be described with reference to the use of a primary field defined by a rapidly swept periodic frequency modulated signal, for example a signal whose frequency content varies progressively from about 165 Hz to 5,280 Hz with a repetition rate of about 80 Hz. Such a signal may be generated by means of a series of capacitors which sequentially are switched into an oscillator circuit to provide a rapidly swept frequency modulated signal. Silicon thyristors are well suited for switching capacitors at the zero crossings of current and are capable of handling very high power.

Referring to the drawings, a primary electromagnetic field, the waveform of which is shown in FIG. 2, is generated by passing current produced by a transmitter 14 through a multi-turn loop 10 which is installed on an aircraft 11 or other vehicle. The power delivered by the transmitter 14 should be at least about one kilowatt. The primary field and the secondary fields reradiated from conductive bodies in the underlying terrain are picked up in one or more receiving coils 15 towed in a finned, torpedo-shaped vehicle, hereinafter referred to as a bird, which is indicated in FIG. 1, by reference number 12. The bird 12 may be equipped with small wings if desired to provide it with some lift to raise it to a convenient towing position behind the aircraft where it will not be caught by trees when flying at low altitude. It is usual to place the receiving coils in orthogonal relationship to each other with one of the coils in maximum coupling with the primary field generated by the loop 10. The receiving coils are connected to preamplifiers the output of which is carried to signal processing equipment in the aircraft 11 via electrical conductors within tow cable 13.

The primary field is detected by the receiving coil 15 in the form of its derivative since the coil 15 is sensitive to the rate of change of the magnetic flux. The received waveform of the primary field is shown in FIG. 3. In the presence of a conductive object such as a sub-surface orebody, the received waveform of the secondary field generated by such conductive body is distorted in the fashion shown in FIG. 4. The positions of the zero crossings of the waveform are distorted and the relative amplitudes of the low and high frequency components of the waveform are changed in the received signal as compared with the primary field.

A convenient way to describe the response of a typical conductor is in terms of its conductivity-thickness product. Thus the response is a function of the absolute conductivity of the material in which the eddy current is flowing multiplied by the thickness of the conductive sheet containing the eddy current. This approach relates to the fact that a high proportion of naturally occurring conductive bodies or formations in the earth have a sheet-like configuration.

The secondary field responses to excitation by a swept frequency waveform for a series of conductive sheets having conductivity-thickness products of 1.6, 3.2, 6.4, 12.8, 25.6 and 51.2 mhos are shown in FIGS. 4 – 9 inclusive, respectively. It will be noted in FIG. 4 where the conductivity thickness product is lowest there is considerable suppression of the low frequency component as compared with the high frequency component. There are also substantial phase shifts of the zero crossings at all frequencies. In FIGS. 8 and 9 at the high conductivity-thickness product end of range, there is very little amplitude distortion of the secondary field with respect to differences between the high and low frequency components, and phase shifts of the zero crossings are confined to the lowest frequency components.

In the case of a body of relatively high conductivity thickness product such as an orebody e.g. 12.8 mhos conductivity thickness product lying beneath a conductive overburden of lower conductivity thickness product (e.g. 1.6 mhos) the combined secondary field response will appear as in FIG. 10.

It will be noted that the waveforms for each conductivity-thickness product have distinctively different characteristics, and the pattern in the combined waveform representing the orebody beneath overburden is also different from all of the single conductivity responses. The signal processing system of the invention has a plurality of output channels for respectively indicating the existence of correlation between a received signal and a plurality of stored signals representative of a plurality of different overburden and orebody conductivity-thickness products. In the case of an orebody lying beneath conductive overburden, an output will be obtained from two channels, one responsive to the overburden conductivity characteristics and the other to the orebody conductivity characteristics.

A block diagram of a preferred embodiment of a signal processing system according to the invention is shown in FIG. 11. A receiving coil 15 in the bird 12 is designed to have sufficient bandwidth to faithfully follow the waveform of the primary field and is connected to a preamplifier 16. The output of the preamplifier 16 is fed to an analogue-to-digital convertor 17 in the aircraft via electrical conductors in the tow cable 13.

The analogue-to-digital convertor 17 is connected to a scanning memory storage 19, which synchronously scans the repetitive waveform and stores it in a digital buffer memory unit 20. The buffer memory 20 is unloaded at periodic intervals such as twice per second and is digitally matched in a small computer 21, against a family of stored waveforms specific to typical overburden and orebody responses.

The procedure used in the computer 21 provides an optimum fit of the reference waveforms, together with the primary waveform, against the received waveforms stored in the buffer memory 20. The received waveforms are coherently averaged, for each receiving coil in turn, for approximately 32 cycles to improve their message/noise ratio. Each resulting time-averaged waveform is then represented mathematically as the sum of a primary waveform plus several reference waveforms, where the amplitudes of the primary and reference waveforms are regarded as parameters to be optimized. The preferred optimization method is that of least squares in which the sum of the squares of the differences between the received waveform and its mathematical representation is minimized for all of the ordinates of the waveform.

Continuous oscillation of the bird about its mean position during flight causes a time-dependent variation of the primary field amplitude at each of the receiver coils. Compensation for the effect of bird movement is achieved by treating the amplitude of the primary field as a linear function of time, thereby adding one additional parameter to be determined during least squares optimization.

For certain configurations of the transmitter and receiver coils the ground response is always positively coupled with one of the receiver coils, in which case the amplitudes of the reference waveforms are constrained to be positive. With the introduction of inequality constraints the sum of squares has several local minima which are weighted according to a goodness of fit criterion to give an optimum solution.

Other factors which are incorporated into the optimization scheme as required are a correction for the induced magnetic field at the receiver coils due to eddy currents in the wings of the aircraft and a frequency-dependent phase shift in the reference waveforms for deep conductors due to interaction with conducting overburden.

The invention has been described as applied to a swept frequency type waveform, but in general there is a wide latitude in the type of primary waveforms that may be used. It is required that the waveform of the primary field be known, time varying, and it should contain a sufficient number and range of frequency components to enable the orebody to be identified.

Whereas it is generally most desirable to employ a primary field having a periodic and repetitive waveform, it is also possible to use a primary field having a waveform that is constituted by "pseudo-random" noise having an appropriate range of frequency components. In this case periodic time samples of the pseudo-random noise field that is transmitted by the loop 10 are transformed in the computer 21 to provide a series of reference waveforms representing the response of a range of conductors. These are matched in the computer 21 against the waveform of the pseudo-random signal detected in the receiver in order to analyse this signal into primary and secondary field components as described for a swept frequency waveform.

In an airborne system designed for prospecting for conductive ore deposits, primary field frequencies of 100 to 10,000 Hz are approximate practical limits. However, the system may be adapted for other specialized geological uses such as the conductivity mapping of surficial geology where it may be desirable to raise the upper frequency to as much as 100 kilohertz. In a ground system for ore prospecting the frequency limits may be advantageously reduced at the lower end in some cases down to frequencies as low as 10 hertz.

The invention has been described as being applied to the entire received waveform. It is possible however when using a pulsed primary field to utilize only the transient portion of the received signal immediately following a primary pulse. This eliminates the very large primary waveform and makes the task of achieving a match against the received wave form with the reference waveforms somewhat less critical. This expedient however reduces signal to noise ratios since the portion of the secondary field that is obscured by the primary waveform no longer is utilized. The pulse wave forms that may be employed when using the transient portion of the received wave form include half sine pulses, saw tooth and ramp pulses, and any other form of pulse in which the main signal is followed abruptly by a period in which the current in the transmitting loop is either zero, a steady current, or has a constant rate of change. In either of these cases the differentiated waveform detected in the receiving coil has zero rate of change in the period which is utilized for detecting secondary field transients.

Whereas the receiving means utilized in the invention has been described as a coil, it will be appreciated that a magnetometer of sufficiently high sensitivity may be employed as an alternative. The majority of magnetometers are not sufficiently sensitive for this application, but as the state of the art advances new magnetometers are being developed which are achieving sensitivities in the vicinity of $10^{-9}$ gauss, and better.

The use of a single horizontal axis receiving coil has been described above. However, there are some advantages to employing two or three orthogonal receiving coils as shown in U.S. Pat. No. 3,105,934 in order to provide additional information on the geometry of the conductive body being detected. Thus a vertical conductive sheet can be more easily differentiated from a dipping sheet using vertical and horizontal axis receiving coils and comparing the two outputs in the computer against pairs of stored signatures.

With regard to the loop 10, it is also possible to use a vertical axis transmitting coil instead of a horizontal axis coil as illustrated in FIG. 1. Such a coil can surround the aircraft and be attached at the nose, wingtips and tail.

The invention has been described as embodying a digital computer for waveform matching in the receiver, and it will be appreciated that this computer can be placed either in the aircraft in order to carry out computations on the signal immediately after they are received or it can be placed on the ground. In the latter case, the received signals can either be telemetered by radio link to a ground station where the processing may be carried out, or can be tape recorded on board the aircraft for subsequent analysis. A convenient method of tape recording is to employ a scanning and synchronously integrated buffer storage which accumulates and averages return signals over periods of approximately ¼ second and then dumps the stored signals onto a digital magnetic tape recorder. This reduces the quantity of tape required and provides an output of wide dynamic range that is ready for processing on the ground using the system that has been described. However, it is possible to record the raw signal using FM tape modulation techniques as opposed to the aforementioned digital integration methods.

The foregoing description has referred to the use of aircraft, but it will be understood that the invention is equally applicable to ground systems in which the transmitting loop is carried on a ground vehicle or laid on the ground. Once again the analysis of the received signal can be carried out in real time or can be telemetered or tape recorded for processing at a central station.

In the usual airborne application of the invention parallel traverses are flown at an altitude typically in the vicinity of 60 meters with intervals in the vicinity of 300 meters between traverses. Profile maps are produced of the amplitudes of the various outputs plotted in graphical form along flight line paths. The procedures used in data plotting are well known in the art of airborne geophysical surveying.

Although the invention has been described with reference to a digital computer, it will be understood that analogue processing techniques could be used instead. Digital processing is however more flexible in terms of the types of reference waveforms that can be stored and in the mathematical analysis techniques that can be used.

With regard to the generation of reference waveforms for matching purposes, it is possible to correlate the received signal against a series of wave forms representing the responses of conductive sheets. The lower conductivity-thickness products representing overburden can be matched by the responses of horizontal conductive sheets, while the higher conductivity-thickness products representing conductive sulphides can be modelled as the responses of vertical or steeply dipping conductive sheets.

Greater sophistication can be introduced into the system by representing the more conductive responses by the response of spherical conductive bodies or of oblate spheroids. The choice of models can be varied according to type of target expected in a given survey area. The more accurate the waveforms that are used to represent the various conditions expected to be encountered, the more perfect will be the separation and discrimination in the computer matching and optimum filtering.

In the case of conductive ore deposits lying beneath conductive overburden, some modification of the response characteristics of the conductive deposit will be caused by interaction with the conductive overburden. The frequency dependent propagation delay of the signal passing through the overburden in both directions can be allowed for in the computer software so that a better and more accurate fit is obtained against the response of the buried ore deposit. This type of treatment is a feature of the invention which allows for discrimination of difficult to detect mineral deposits heavily masked by conductive overburden.

The generation of appropriate reference wave forms representing different conductive conditions for use in the computer correlation can be carried out by mathematical modelling or actual field measurements. In many cases a set of mathematical models can be stored and can be updated in specific situations with responses stored in the field over known targets. Thus in looking for further occurrences of a given class of ore deposit in a district, the response of the known ore deposits can first be recorded and used for a reference against which to compare received signals during an exploratory program.

Although the invention has been described primarily in its relation to its application to geophysical exploration for mineral deposits and the like, it may also have utility as a metal detector, mine detector, and weapons detector. Transmitting and receiving coils may be mounted in rigid juxtaposition and a frequency swept signal employed covering a range such as 1,000 Hz to 20 kilohertz. The response characteristics can be analyzed in a similar manner, but the frequency requirements are much higher due to the small size of the objects being detected. Major differences exist between the responses of ferrous and non-ferrous metallic objects, and the response signatures are also very much a function of size. With appropriate computer matching against a variety of signatures, superior discrimination for specific targets can be obtained than with previous single frequency or dual frequency metal detection systems. Examples of waveforms are shown in FIGS. 12 to 15.

Figure 12:
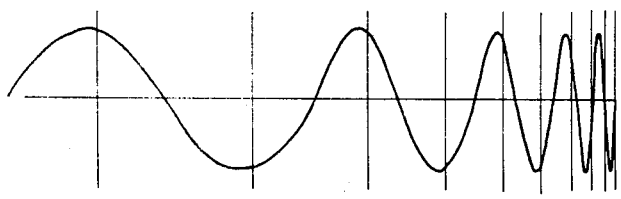
Figure 13:
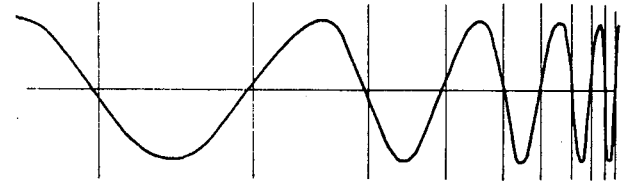
Figure 14:
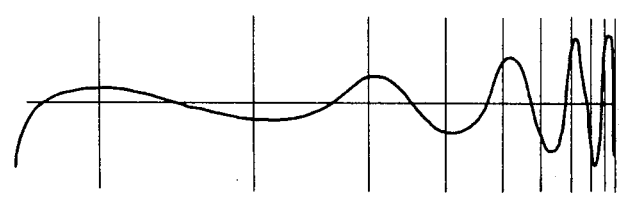
Figure 15:
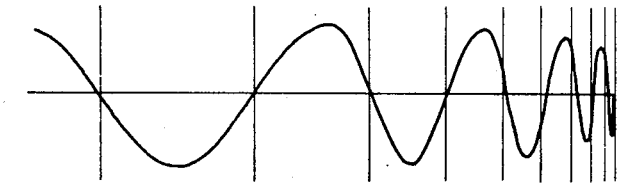

FIG. 12 is the current waveform in the transmitter and FIG. 13 is the voltage waveform in the receiver from the primary field. FIG. 14 is the secondary field waveform detected from a small non-ferrous metal object and FIG. 15 is the waveform from a small steel object.

What I claim is:

1. A method of detecting a conductive body in an area comprising:
   a. generating a primary electromagnetic field and directing said primary field towards said area, said primary field being defined by a time varying waveform of known frequency and phase composition, said field containing a plurality of frequency components sufficient to permit the identification of said conductive body in said area, said primary field causing eddy currents to be induced in any conductive body present in said area which is intersected by said primary field, said eddy currents resulting in the formation of secondary electromagnetic fields,
   b. receiving electromagnetic signals in the vicinity of said primary electromagnetic field, said received signals including a first portion comprising signals emanating from said areas which are responsive in phase and amplitude to each frequency component of said secondary electromagnetic fields, and a second portion that is attributable to direct coupling with said primary electromagnetic field, c. storing a plurality of reference signals which characterize (i) predetermined components of said primary field, and (ii) predetermined components of secondary fields which would emanate from a plurality of predetermined types of conductive bodies when such bodies are intersected by said primary field, and d. comparing said first and second portions of said received electromagnetic signals with said stored reference waveforms and indicating the reference waveforms which respectively provide optimum correlation with one or more selected components of said received signals.

2. A method of geophysical prospecting as claimed in claim 1 wherein said comparing step includes successive steps of subtracting each of said stored reference waveforms from said received signals in order to determine optimum match by obtaining the least squares minimum.

3. A method of geophysical exploration as claimed in claim 1 wherein said primary field is defined by a rapidly swept, periodic frequency modulated waveform.

4. A method of geophysical exploration as claimed in claim 3 wherein the primary field contains components of frequencies in the range between about 165 to 5,300 Hz.

5. A method as claimed in claim 4 wherein the primary field is defined by a periodic waveform having a repetition rate of approximately 80 Hz.

6. A method of geophysical prospecting comprising:
a. traversing an area of the earth to be explored,
b. generating a primary electromagnetic field and coupling said primary field with an area of the earth, said primary field being defined by a time varying waveform of known frequency and phase composition, said field containing a plurality of frequency components sufficient to permit the identification of mineral deposits which may be located in said area, said primary field causing eddy currents to be induced in any conductive deposits present in said area which are intersected by said primary field, said eddy currents resulting in the formation of secondary electromagnetic fields, c. receiving electromagnetic signals in the vicinity of said primary electromagnetic field, said received signals including a first portion comprising signals emanating from the earth which are responsible in phase and amplitude to each frequency component of said secondary electromagnetic fields, and a second portion that is attributable to direct coupling with said primary electromagnetic field, d. storing a plurality of reference signals which characterize (i) predetermined components of said primary field, and (ii) predetermined components of secondary fields which would emanate from a plurality of predetermined types of conductive deposits when such deposits are intersected by said primary field, and e. comparing said first and second portions of said received electromagnetic signals with said stored reference waveforms and indicating the reference waveforms which respectively provide optimum correlation with one or more selected components of said received signals, and f. determining the positions in said area of the earth in which said electromagnetic signals were received.

* * * * *